May 6, 1924.

F. B. CROSBY

CONVEYING MECHANISM 1,492,628

Filed Jan. 26, 1922

Inventor:
Fred B. Crosby
By Owen W. Kennedy
Attorney

Patented May 6, 1924.

1,492,628

UNITED STATES PATENT OFFICE.

FRED B. CROSBY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYING MECHANISM.

Application filed January 26, 1922. Serial No. 531,880.

*To all whom it may concern:*

Be it known that I, FRED B. CROSBY, a citizen of the United States, residing at Worcester, in the county of Worcester and Commonwealth of Massachusetts, have invented a new and useful Improvement in a Conveying Mechanism, of which the following, together with the accompanying drawings, is a specification.

My invention relates to conveying mechanisms for metal rods or bars, to be used in connection with a rolling mill for receiving and advancing the material leaving the mill, and for transferring the same to a suitable receiving mechanism, such as a cooling bed.

A conveying mechanism of the above described type is shown and described in United States Patent No. 701,024, granted May 27, 1902, to Victor E. Edwards, and generally comprises a series of rolls for conveying rods or bars longitudinally and delivering the same sidewise to a suitable run-out or trough, from which the bars are transferred to a cooling bed. The cooling bed consists of a series of spaced inclined skids having projecting portions for arresting the downward movement of the bars so that when the skids are oscillated, a step-by-step movement is imparted to the bars as they move sidewise down the cooling bed. When operating cooling beds of the above described type, certain difficulties have arisen, owing to the fact that the heated bars tend to bend at the points where they are supported by the skids if they are transferred immediately from the rolls to the cooling bed without being allowed to cool off.

In my copending application, Serial No. 356,323, filed February 4, 1920, I have shown and described an arrangement for use in connection with a conveying mechanism and cooling bed of the Edwards type in which means are provided for automatically arresting the movement of the rods or bars as they progress from the conveyor rolls to the cooling bed, in order that each rod may lie in an intermediate trough an appreciable time before being transferred to the first notch of the cooling bed. The delay in the movement of a bar is brought about by the functioning of various electrically controlled devices which are adapted to be set in operation by the movement of a bar along the rolls, and the length of time that each bar lies in the intermediate trough is definitely predetermined by the setting of certain time controlled devices.

Figure 1:
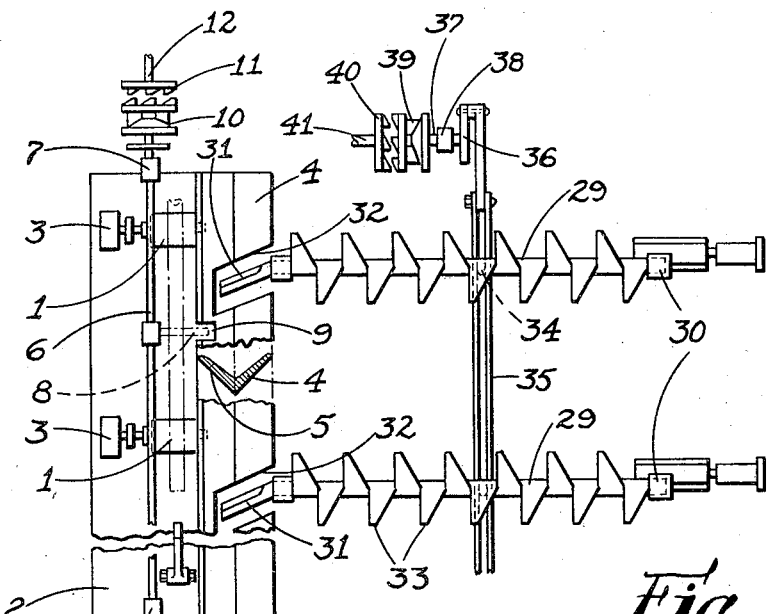

The object of the present invention is to further develop the principle of operation set forth in my above described copending application by providing an improved arrangement of the control devices whereby the length of time that a bar is allowed to lie in a position intermediate the conveyor rolls and the cooling bed is definitely determined by the time that elapses between the delivery of a given bar to the conveyor rolls and the delivery of the next succeeding bar to the conveyor rolls. In this way, each bar is allowed to lie in its intermediate cooling position a maximum length of time that is determined by the rate of delivery of bars to the conveyor rolls. These and other advantageous features of my invention will hereinafter more fully appear, reference being had to the accompanying drawings, in which, Fig. 1 is a plan view of a conveying mechanism embodying my invention.

Figure 2:
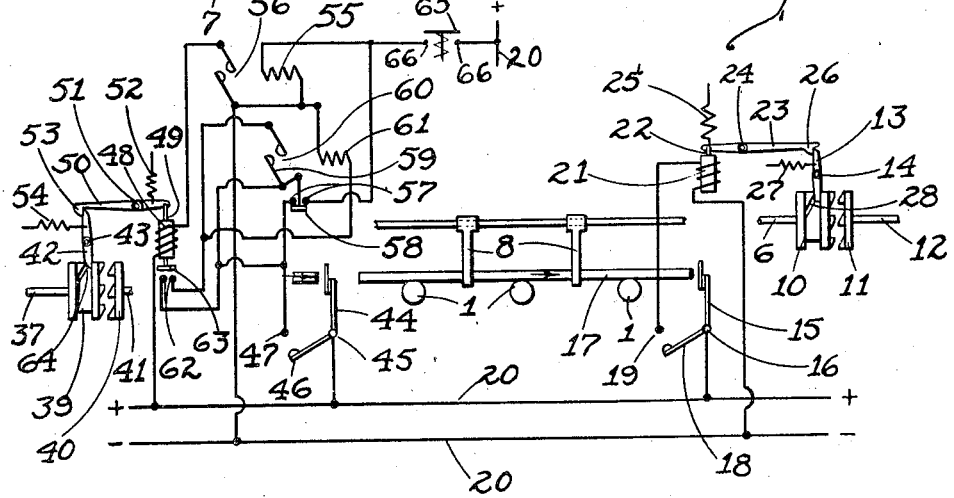

Fig. 2 is a diagrammatic view showing the general arrangement of apparatus and the electrical connections controlling the operation of the same.

Like reference characters refer to like parts in the different figures.

Referring to the drawings, the conveying mechanism generally comprises a plurality of conveyor rolls 1 rotatably mounted upon an elevated platform 2. The rolls 1 are respectively driven by any suitable means, such as electric motors 3. An L-shaped trough 4 is supported with the upper edge of one side 5 substantially flush with the peripheries of the rolls 1, so that the bottom of the trough 4 lies below the tops of the rolls. A shaft 6 rotatably mounted in bearings 7, above the platform 2, extends parallel to the trough 4 and is provided with a plurality of spaced kick-off arms 8 which extend downwardly between adjacent rolls 1. The arms 8 are adapted to turn with the shaft 6 and the side 5 of the trough 4 is provided with notches 9 to permit turning movement of the arms 8, as will be hereinafter described.

The shaft 6 is provided at one end with a movable clutching element 10 that is adapted to engage a corresponding clutching element 11 provided at the end of a shaft 12 which is continuously driven from a suitable source of power, not shown. As best shown in Fig. 2, a shifting arm 13, pivotally mounted at 14, is adapted to move the element 10 into engagement with the element 11, and when the shaft 6 is thereby clutched to the shaft 12, the kick-off arms 8 will move upwardly between the rolls 1 in the direction of the trough 4. A trigger 15 is pivotally mounted at 16 at a point beyond the rolls 1, so that it is adapted to be engaged by the advancing end of a bar 17 as the latter is moved across the platform 2 by the rolls 1. A contact arm 18 is adapted to turn with the trigger 15 and to be moved with respect to a stationary contact member 19, the normal position of the trigger 15, when not engaged by a bar 17, being such as to hold the contact arm 18 away from the contact member 19.

The contact arm 18 is connected to one of two supply mains 20, which are in turn connected to some suitable source of electrical energy, not shown. The stationary contact member 19 is connected to one terminal of an energizing coil 21 of a solenoid the other terminal of which is connected to the other supply main 20. A plunger 22 of the solenoid is pivotally connected to one end of a lever 23 pivotally mounted at 24. One end of the lever 23 is acted upon by a spring 25 which tends to retract the plunger 22 of the solenoid when the coil 21 is de-energized. The other end of the lever 23 is provided with a projection 26 which serves to maintain the shifting arm 13 in a substantially vertical position against the action of a spring 27, tending to turn the arm 13 about its pivot. In the vertical position the arm 13 holds the clutching elements 10 and 11 out of engagement with each other.

When a bar 17 is delivered to the rotating conveyer rolls 1, it is moved longitudinally across the platform 2 until it nearly reaches the end of same, whereupon the advancing end of the bar depresses the trigger 15 and causes the contact arm 18 to engage the contact member 19, thereby energizing the coil 21. The plunger 22 of the solenoid is thereupon drawn down within the coil 21 and the lever 23 is turned in a counter clockwise direction against the action of the spring 25. This movement of the lever 23 releases the upper end of the shifting arm 13 from the projection 26, whereupon the spring 27 turns the arm 13 about its pivot to cause the shaft 6 to be clutched to the shaft 12 through engagement of the clutching elements 10 and 11. The resulting rotation of the shaft 6 causes the kick-off arms 8 to move upwardly between the rolls 1 and remove the bar 17 from the rolls 1 to the trough 4, in which the bar then lies stationary. After the arms 8 have removed the bar 17 from the rolls 1, the shaft 6 continues to turn until it has completed substantially one revolution. At this point the clutching elements 10 and 11 are moved out of engagement with each other by any suitable means, such as a cam device 28 cooperating with the arm 13, and the shaft 6 comes to rest. As the arm 13 is moved by the cam device it raises the end of the lever 23 until the projection 26 again engages the arm 13 and prevents its movement by the spring 27, for it is obvious that by the time the shaft 6 has completed one revolution, the trigger 15 will have returned to its original position, thereby de-energizing the coil 21. In this way the shaft 6 is allowed to make only one complete revolution, thereby returning the kick-off arms 8 to their original position to remove the next bar advancing over the rolls 1.

The exact form of the device for disengaging the clutching elements 10 and 11 after the shaft 6 has made one complete revolution forms no part of the present invention, and as such devices are well known in the art, it is not believed necessary to further describe the same herein.

Following the removal of the bar 17 from the rolls 1 to the trough 4, as described above, the bar will lie undisturbed at the bottom of the trough 4 until it is acted upon by instrumentalities for removing it to the cooling bed, which will now be described. Referring to Fig. 1, the cooling bed comprises a plurality of inclined skids 29, rotatably mounted at their ends in bearings 30 and respectively provided at their upper ends with oblique wings 31, adapted to move in slots 32 provided in the trough 4, when the skids 29 are turned on their axes. Each skid 29 is provided with a series of projecting lugs 33 which are alternately arranged to extend substantially at right angles to each other in opposite directions. Each skid 29 is further provided with a downwardly extending arm 34 and all of the arms 34 are secured together by means of a link 35. The link 35 is connected to a crank disk 36 which is carried at one end of a shaft 37 rotatably mounted in a bearing 38. The other end of the shaft 37 is provided with a movable clutching element 39 that is adapted to engage a corresponding clutching element 40, mounted on a shaft 41 that is continuously driven from a suitable source of power, not shown, the clutching elements 39 and 40 being similar to the clutching elements 10 and 11.

As best shown in Fig. 2, a shifting arm 42, pivotally mounted at 43, is adapted to move the element 39 into engagement with the element 40, and when the shaft 37 is thereby clutched to the shaft 41, rotation of the same will result in a reciprocating motion of the link 35. This movement of the link 35 will, in turn cause an oscillatory movement of the skids 29, which in turn will cause the inclined wings 31 to move upwardly in the slots 32 in the trough 4.

A trigger 44, pivotally mounted at 45, is arranged in front of the rolls 1, so that it is in the path of movement of a bar 17 as the latter is delivered to the rolls 1. A contact arm 46 is adapted to turn with the trigger 44 and to be moved with respect to a stationary contact member 47. The contact arm 46 is connected to one of the supply mains 20, and the contact member 47 is adapted to be connected to one terminal of a coil 48 of a solenoid, the other terminal of the coil 48 being connected to the other supply main 20. Various contact making devices are interposed between the member 47 and the coil 48, to be hereinafter described. A plunger 49 of the solenoid is pivotally connected to one end of a lever 50, pivotally mounted at 51, and acted upon by a spring 52 which normally tends to hold the plunger 49 retracted from the coil 48 when the latter is deenergized. The other end of the lever 50 is provided with a projection 53 which serves to maintain the shifting arm 42 in a substantially vertical position against the action of a spring 54 tending to turn the arm 42 in a counter clockwise direction about its pivot 43. In its vertical position, the arm 42 holds the clutching elements 39 and 40 out of engagement with each other.

The contact member 47 is connected to the closing coil 55 of a contactor 56 through contact members 57 which are normally bridged by a member 58. The bridging member 58 is connected to the movable arm 59 of a contactor 60, so that the contact members 57 are bridged when the contactor 60 is open. The closing coil 61 of the contactor 60 has one terminal thereof connected to one supply main 20, while the other terminal thereof is adapted to be connected to the contact member 47 through a pair of contact members 62. The contact members 62 are normally open, but are adapted to be bridged by a member 63, mounted on the plunger 49 of the solenoid 48, when the latter is energized.

Assuming that a bar 17 has been removed from the rolls 1 to the trough 4, as previously described, the bar will remain stationary in the bottom of the trough until the advancing end of the next bar that is delivered to the rolls 1 depresses the trigger 44 and thereby engages the contact arm 46 with the contact member 47. When this occurs the coil 55 of the contactor 56 is energized through the contact members 57, thereby closing the contactor 56 and energizing the solenoid 48. When this occurs, the retraction of the plunger 49 moves the lever 50 against the spring 52 and releases the arm 42 from the projection 53. The spring 52 is then free to turn the arm 42 and move the clutching element 39 into engagement with the clutching element 40. The shaft 37 is then driven by the shaft 41 which causes the skids 29 to be moved in one direction, whereupon the wings 31 are shifted upwardly to remove the bar 17 from the trough 4 to the first series of lugs 33, which will prevent further downward movement of the bar. Just as the shaft completes one revolution to cause the above described action of the wings 31, the clutching elements 39 and 40 are disengaged by any suitable means, such as a cam device 64 cooperating with the arm 42 in the same manner that the cam 28 cooperates with arm 13, whereupon the shaft 37 comes to rest. This movement of the arm 42 lifts the lever 50 and allows the projection 53 to again lock the arm 42 in a vertical position, the solenoid 48 in the meantime having been deenergized by the operation of the contact making devices to prevent further operation of the racking mechanism until the arrival of the next bar, as will now be described.

When the plunger 49 is retracted by the energization of the solenoid 48, to actuate the racking mechanism, the member 63 bridges the contacts 62 and thereby energizes the coil 61 of the contactor 60. The closing of the contactor 60 causes the movable contactor arm 59 to move the bridging member 58 out of engagement with the contact members 57, thereby opening the circuit of the coil 55 of the contactor 56. The solenoid 48 is thereupon de-energized. This de-energization of the solenoid 48 prevents further operations of the racking mechanism, even though the trigger 44 remains depressed by the passage of the bar over the rolls 1. De-energization of the solenoid 48 also causes the contacts 62 to be opened, but the circuit of the coil 61 of the contactor 60 is maintained through the then closed contacts 59, 46 and 47, so that the coil 61 remains energized as long as the trigger 44 is depressed by the passage of a bar over the rolls 1. When the bar has passed completely on to the rolls 1 the trigger 44 is released and the breaking of the circuit at 47 causes the contactor 60 to open, so that all parts again occupy the position shown in Fig. 2.

Obviously, the next bar delivered to the rolls 1 will depress the trigger 44 and automatically cause the racking mechanism to be moved through one notch, as described above.

The limited movement of the skids 29 will be repeated each time that a bar depresses the trigger 44 as it is delivered to the rolls, so that an intermittent oscillatory movement is imparted to the skids which will result in bars carried by the skids being moved downwardly on the cooling bed with a step-by-step motion.

From the foregoing, it is apparent that each time a bar is conveyed to the end of the platform 2 by the rolls 1, it will be immediately transferred from the rolls 1 to the bottom of the trough 4. The bar will then remain stationary in the trough until the advancing end of the next bar that is delivered to the rolls, depresses the trigger 44, whereupon the bar in the trough 4 will be removed to the skids, down which it will be moved with a step-by-step motion. It is obvious that while a given bar is lying in the trough 4, it will cool off, while supported along its entire length, so that when it is removed to the skids it will not be liable to bend between its points of support on the skids. It is also obvious that the length of time which a given bar is allowed to lie in the trough 4 is entirely dependent upon the rate of delivery of bars to the rolls. Consequently, each bar undergoes a maximum amount of cooling off, for each bar is permitted to lie undisturbed in the trough until the advancing end of the next succeeding bar has almost reached the rolls 1. In this way, the effectiveness of my device in causing a delay in the movement of a bar from the rolls to the skids, is in no way impaired by any irregularities in the operation of the mill which might cause the bars to be delivered to the rolls at irregular intervals. The longer the intervals between the delivery of bars to the rolls, the greater will be the cooling of the bars as they lie in the trough 4.

Furthermore, my improved device is believed to be extremely advantageous from an operating standpoint, inasmuch as it is entirely automatic in its operation and requires no attention whatsoever from an operator. As long as bars are delivered to the rolls they will be removed therefrom to the cooling bed, with a delay in their transfer, the length of which is determined entirely by the time interval between the delivery of successive bars to the conveying mechanism.

In order that the racking mechanism may be caused to function independently of the operation of the trigger 45 by the bars, a push button 65 is adapted to cooperate with contact members 66, one of which is connected to one terminal of the coil 55 of the contactor 56, and the other of which is connected to the positive supply main 20. The push button 65 is normally held out of engagement with the contacts 66, but should the operator desire to cause the racking mechanism to function, it is only necessary to press the push button 65, thereby holding the circuit of the solenoid 48 closed as long as may be desired.

While I have shown my invention in its simplest and preferred form it is not so limited, but is susceptible of various modifications within the scope of the appended claims.

I claim,

1. In a mechanism of the class described, a plurality of rolls for moving bars longitudinally, a cooling bed for moving the bars sidewise, and means for transferring the bars from the rolls to the cooling bed, with a delayed action automatically controlled by the delivery of successive bars to the rolls.

2. In a mechanism of the class described, a plurality of rolls for moving bars longitudinally, a cooling bed for moving the bars sidewise, and means for transferring the bars from the rolls to the cooling bed, with a time interval in the transfer of each bar, the duration of which is determined by the time intervals between the delivery of successive bars to the rolls.

3. In a mechanism of the class described, the combination with a plurality of rolls for moving bars longitudinally, a cooling bed for moving the bars sidewise, and a support interposed between the rolls and the bed, of means dependent upon the movement of a bar along the rolls for transferring it to said support, and other means dependent upon the delivery of the next succeeding bar to the rolls for transferring the first named bar from the support to the bed.

4. In a mechanism of the class described, the combination with a plurality of rolls for moving bars longitudinally, a cooling bed for moving the bars sidewise, and a support interposed between the rolls and the bed, of means for causing each bar to lie on said support a definite time interval corresponding to the time interval elapsing between the delivery of a given bar to the rolls and the delivery of the next succeeding bar to the rolls.

5. In a mechanism of the class described, the combination with a plurality of rolls for moving bars longitudinally and a cooling bed for moving bars sidewise, of means dependent upon the movement of a bar along the rolls for initiating a transfer of the same from the rolls to the bed, and other means dependent upon the delivery of the next succeeding bar to the rolls for completing the transfer of the first named bar from the rolls to the bed.

6. In a mechanism of the class described, the combination with a plurality of rolls for moving bars longitudinally, a cooling bed for moving the bars sidewise and a support interposed between the rolls and the bed, of means for causing the bars to lie on the support for time intervals corresponding to the time intervals between the delivery of successive bars to the rolls.

Dated this 9th day of January, 1922.

FRED B. CROSBY.

Witnesses:
    CARROLL I. SMITH,
    J. E. SHEPERDS.